(12) United States Patent
Sugawara et al.

(10) Patent No.: US 6,905,086 B2
(45) Date of Patent: Jun. 14, 2005

(54) SPINNING-REEL FISHING-LINE GUIDING MECHANISM

(75) Inventors: Ken'ichi Sugawara, Sakai (JP); Takeshi Ikuta, Sakai (JP)

(73) Assignee: Shimano Inc., Osaka (JP)

( * ) Notice: Subject to any disclaimer, the term of this patent is extended or adjusted under 35 U.S.C. 154(b) by 72 days.

(21) Appl. No.: 10/635,518

(22) Filed: Aug. 7, 2003

(65) Prior Publication Data

US 2004/0041043 A1 Mar. 4, 2004

(30) Foreign Application Priority Data

Aug. 28, 2002 (JP) ........................................ 2002-249253

(51) Int. Cl.[7] .............................................. A01K 89/01
(52) U.S. Cl. ...................................... 242/231; 242/228
(58) Field of Search ......................... 242/228, 230–234

(56) References Cited

U.S. PATENT DOCUMENTS

| | | | | |
|---|---|---|---|---|
| 5,848,757 A | * | 12/1998 | Amano et al. | 242/231 |
| 5,868,331 A | * | 2/1999 | Shinohara et al. | 242/231 |
| 5,944,274 A | * | 8/1999 | Kaneko | 242/231 |
| 6,161,786 A | * | 12/2000 | Ohara et al. | 242/231 |
| 6,220,537 B1 | * | 4/2001 | Amano et al. | 242/231 |
| 6,405,955 B2 | * | 6/2002 | Furomoto | 242/231 |
| 6,572,042 B2 | * | 6/2003 | Sugawara | 242/231 |
| 6,595,449 B2 | * | 7/2003 | Ikuta et al. | 242/231 |

FOREIGN PATENT DOCUMENTS

| | | | | |
|---|---|---|---|---|
| EP | 1121855 A1 | | 8/2001 | |
| GB | 2117611 A | * | 10/1983 | 242/31 |
| JP | 2001-238579 A | | 9/2001 | |
| JP | 2001-258436 A | | 9/2001 | |

* cited by examiner

*Primary Examiner*—Emmanuel M Marcelo
(74) *Attorney, Agent, or Firm*—Shinjyu Global IP Counselors, LLP

(57) ABSTRACT

A bail arm includes a first bail-support member, a second bail-support member, a bail, a stationary shaft, a line roller, and a stationary shaft cover. The bail includes a rod-shaped portion formed into a rod shape and a plate-shaped portion formed into a plate shape. One end of the plate-shaped portion is inserted into a slit-shaped groove portion formed in the stationary shaft cover such that at least radially outer sides of the plate-shaped portion and the stationary shaft cover define a continuous and smooth surface. The other end of the plate-shaped portion is formed continuously and smoothly with the rod-shaped portion.

20 Claims, 7 Drawing Sheets

SPINNING-REEL FISHING-LINE GUIDING MECHANISM

BACKGROUND OF THE INVENTION

1. Field of the Invention

This invention generally relates to fishing-line guiding mechanisms. More specifically, the present invention relates to fishing-line guiding mechanisms mounted pivotably to the fore-ends of first and second rotor arms of a spinning-reel, for guiding fishing line onto the spool.

2. Background Information

Spinning reels are usually equipped with a fishing-line guiding mechanism for guiding fishing line onto a spool. The fishing-line guiding mechanism is conventionally mounted on the fore-ends of first and second rotor arms so as to be rotatable with a rotor. The fishing-line guiding mechanism is pivotable between a line-releasing posture and a line-guiding posture. The fishing-line guiding mechanism is furnished with first and second bail-support members, a stationary shaft, a stationary shaft cover, a bail, and a line roller. One end of the stationary shaft is fastened to the fore-end of the first bail-support member, while the stationary shaft cover is fastened to the other end of the stationary shaft. Conventionally, a first end of the bail is fixedly mounted to the stationary shaft cover. The second end of the bail is fitted to the fore-end of the bail support member. The line roller is supported by the stationary shaft. Further, there is a surface level difference at a portion joining the stationary shaft cover and the bail.

When winding fishing line onto the spool with a spinning reel equipped with a fishing-line guiding mechanism such as this, the bail is flipped into the line-guiding posture as the handle is rotated. As a consequence, the fishing line is guided by the bail to the stationary shaft cover, and then to the outer peripheral surface of the line roller, with which the fishing line comes into contact. Then, the fishing line is guided by the line roller, changing its course, and is wound onto the outer circumference of the spool.

The foregoing conventional fishing-line guiding mechanism has a surface level difference between the stationary shaft cover and the bail. For this reason, the fishing line guided to the line roller is likely to be hooked on the surface level difference, which prohibits the fishing line from being smoothly guided. This causes the fishing line to be twined between the stationary shaft cover and the bail, leading to line-tangling.

In view of the above, there exists a need for fishing-line guiding mechanisms that overcome the above-mentioned problems in the prior art. This invention addresses this need in the prior art as well as other needs, which will become apparent to those skilled in the art from this disclosure.

SUMMARY OF THE INVENTION

A purpose of the present invention is to prevent line tangling in a spinning-reel fishing-line guiding mechanism.

A spinning-reel fishing-line guiding mechanism in accordance with a first aspect of the present invention is a spinning-reel fishing-line guiding mechanism mounted fore-endwise on first and second rotor arms so as to pivot between a line-releasing posture and a line-retrieving posture. The spinning-reel fishing-line guiding mechanism is provided to guide fishing line onto the spinning-reel spool. The spinning-reel fishing-line guiding mechanism includes first and second bail-support members, a stationary shaft, a stationary shaft cover, a line roller, and a bail. The first and second bail-support members are mounted pivotably on respective fore-ends of the first and second rotor arms. The stationary shaft is fixedly coupled to the first bail support member. The line roller is rotatably supported on the stationary shaft and has a guide portion defined on its circumferential surface for guiding the fishing line. The line roller is configured to guide the fishing line. The stationary shaft cover is fixedly coupled to the stationary shaft and spaced apart from the first bail-support member to guide the fishing line to the line roller. An end of the stationary shaft cover has a groove portion opening in a slit shape. The bail is curved and disposed radially outward relative to the spool to guide the fishing line onto the line roller via the stationary shaft cover. The bail has a rod-shaped portion on one end, and the plate-shaped portion on the other end. One end of the rod shaped portion is fastened to the second bail support member. The plate-shaped portion is formed continuously and smoothly with the rod-shaped portion. The plate-shaped portion is inserted into the groove portion so as to join with the stationary shaft cover such that radially outer sides of the plate-shaped portion and the stationary shaft cover define a continuous and smooth surface.

In this fishing-line guiding mechanism, the bail has a rod-shaped portion and a plate-shaped portion integrally joined continuously and smoothly. Further, the plate-shaped portion is further joined continuously and smoothly with the fishing-line guiding side of the stationary shaft cover. Since the bail is joined with the fishing-line guiding side of the stationary shaft cover such that a continuous and smooth fishing-line guiding surface is defined, there is no surface level difference between the stationary shaft cover and the bail. Thus, the fishing line is not easily hooked or caught between the stationary shaft cover and the bail. In addition, because the rod-shaped portion and the plate-shaped portion are integrally formed such that they are joined continuously and smoothly with each other to form a unitary member, there is no surface level difference between the rod-shaped portion and the plate-shaped portion either. Thus, it is possible to prevent line tangling.

A fishing-line guiding mechanism according to a second aspect of the present invention is the fishing-line guiding mechanism of the first aspect, wherein the plate-shaped portion is formed by press-working. In this case, the plate-shaped portion is easily formed since it is formed by press-working.

A fishing-line guiding mechanism in accordance with a third aspect of the present invention is the fishing-line guiding mechanism of the first or second aspect, wherein the plate-shaped portion has a substantially triangular shape. In this case, the rod-shaped portion and the plate-shaped portion are more smoothly joined continuously.

A fishing-line guiding mechanism in accordance with a fourth aspect of the present invention is the fishing-line guiding mechanism of any one of the first to third aspects, wherein the plate-shaped portion has an aperture. In this case, weight reduction of the bail can be realized.

A fishing-line guiding mechanism in accordance with a fifth aspect of the present invention is the fishing-line guiding mechanism of any one of the first to fourth aspects, wherein the plate-shaped portion is inserted into the groove portion such that radially inner sides of said plate-shaped portion and the stationary shaft cover define a continuous and smooth surface. In this case, the design is improved by the plate-shaped portion joined continuously and smoothly with the side of the stationary shaft cover that is opposite the fishing-line guiding side.

A fishing-line guiding mechanism in accordance with a sixth aspect of the present invention is the fishing-line guiding mechanism of any one of the first to fifth aspects, wherein the rod-shaped portion is a solid columnar member. In this case, the strength of the bail is kept high.

A fishing-line guiding mechanism in accordance with a seventh aspect of the present invention is the fishing-line guiding mechanism of any one of the first to fifth aspects, wherein the rod-shaped portion is a hollow tubular member. In this case, the weight of the bail can be reduced.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
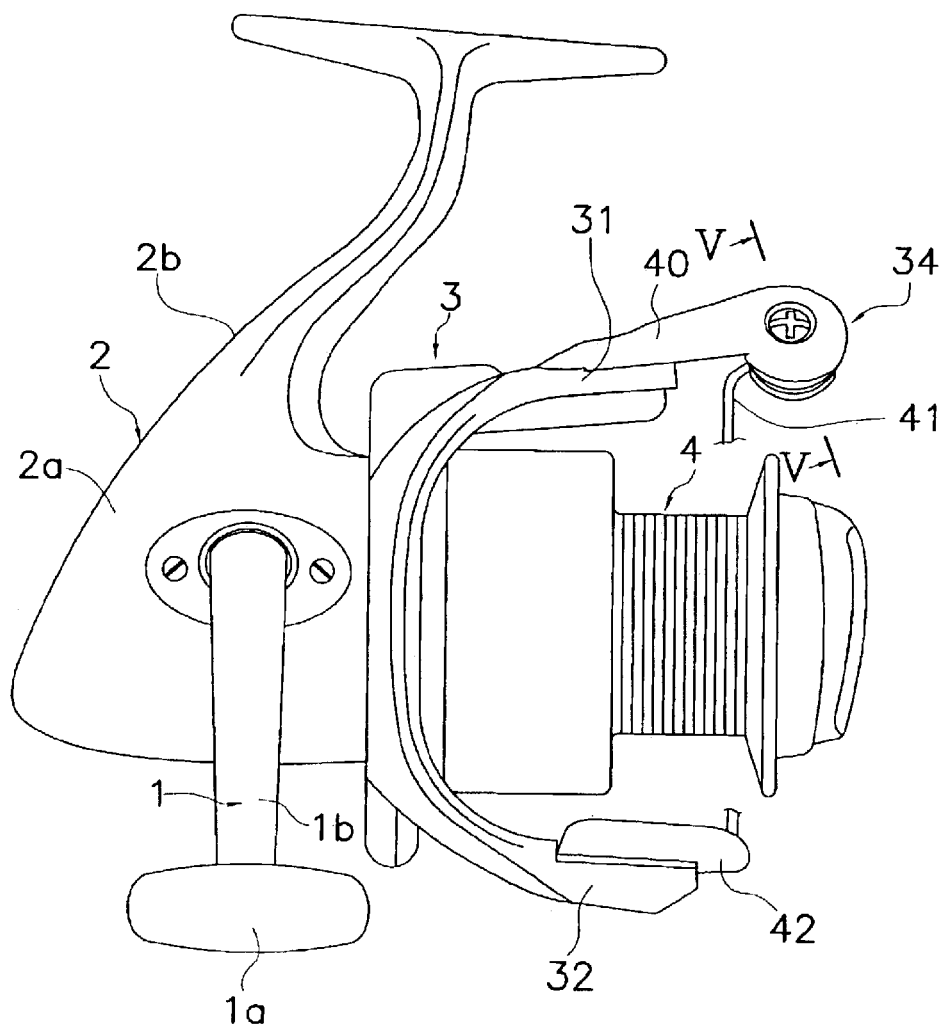
FIG. 1 is a right-side elevational view of a spinning reel in accordance with a preferred embodiment of the present invention.
Figure 2:
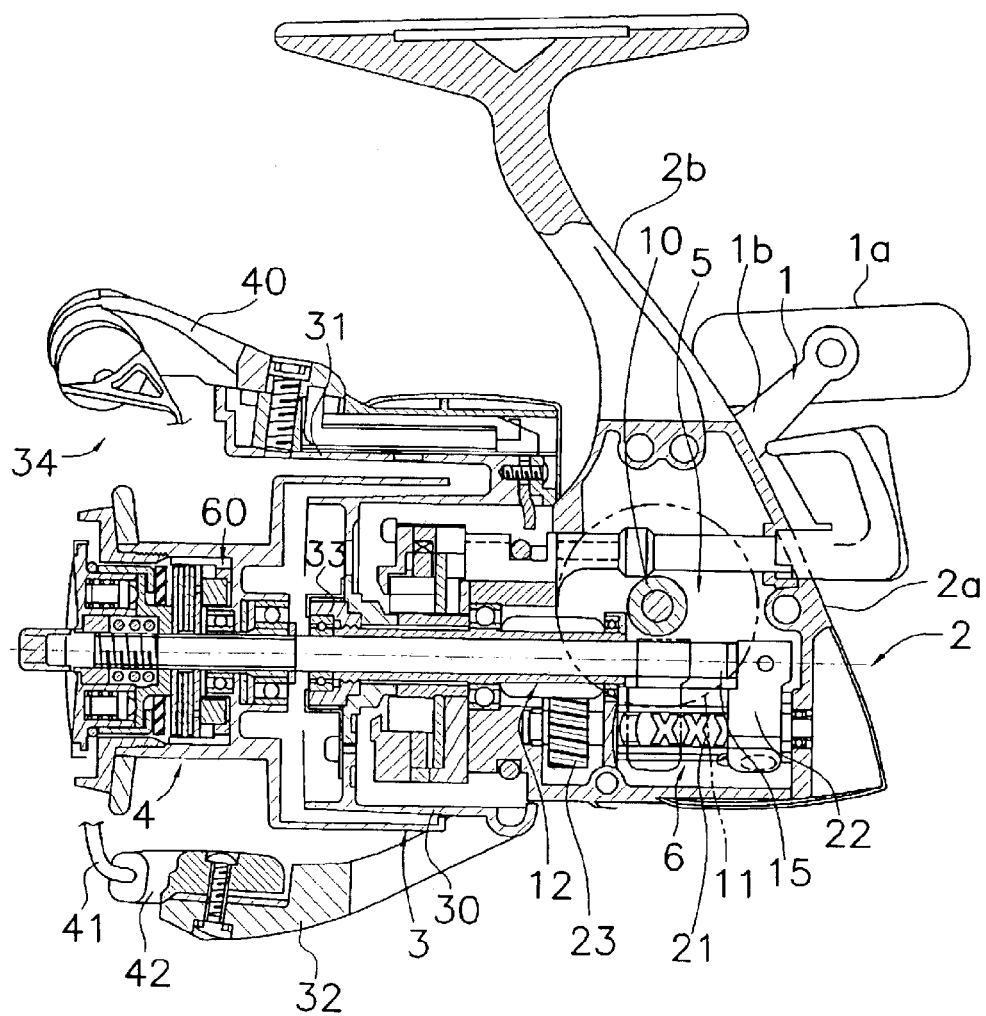
FIG. 2 is cross-sectional left-side elevational view of the spinning reel in accordance with a preferred embodiment of the present invention.

As shown in FIGS. 1 and 2, a spinning reel in accordance with a preferred embodiment of the present invention is primarily equipped with a handle 1, a reel unit 2, which rotatably supports the handle 1, a rotor 3, and as pool 4. The rotor 3 is rotatably supported in front of the reel unit 2. The spool 4 is provided to wind fishing line around its outer circumferential surface. The spool 4 is disposed in front of the rotor 3 so that it can shift back and forth relative to the rotor 3. The handle 1 has a T-shaped grip 1a and an L-shaped crank arm 1b. The grip 1a is rotatably mounted on the fore-end of the crank arm 1b.

As shown in FIGS. 1 and 2, the reel unit 2 includes a reel body 2a having an opening on its side, and a T-shaped rod-mounting leg 2b extending diagonally up and frontward from and integrally with the reel body 2a. As shown in FIG. 2, the reel body 2a has in its interior a mechanism mounting space, which accommodates a rotor drive mechanism 5 to rotate the rotor 3 in cooperation with the rotation of the handle 1. The reel body 2a also has an oscillating mechanism 6 to wind the fishing line uniformly by shifting the spool 4 back and forth relative to the reel body 2a.

As shown in FIGS. 1 and 2, the spool 4 is disposed between a later-described first rotor arm 31 and a later-described second rotor arm 32 of the rotor 3. Further, the center portion of the spool 4 is coupled to the fore-end of the spool shaft 15 through a drag mechanism 60 shown in FIG. 2.

As shown in FIG. 2, the rotor drive mechanism 5 includes a handle shaft 10 to which the handle 1 is non-rotatably mounted, a master gear 11 that rotates together with the handle shaft 10, and a pinion gear 12 that meshes with the master gear 11. Both ends of the handle shaft 10 are rotatably supported on the reel unit 2 via bearings. The handle shaft 10 has female-threaded portions formed on its either end. The female-threaded portions have different thread directions and diameters so that the handle 1 can be fitted non-rotatably onto either of the female-threaded portions.

The pinion gear 12 has a tubular form. Further, the front portion of the pinion gear 12 penetrates the center portion of the rotor 3 and is fastened to the rotor 3 by a nut 33. Further, the pinion gear 12 is rotatably supported on the reel unit 2 at its mid-portion and its axial rear-end portion via respective bearings.

The oscillating mechanism 6 is provided to shift the spool 4 back and forth relative to the reel body 2a. The oscillating mechanism 6, as shown in FIG. 2, has a worm shaft 21 disposed almost directly below and parallel to the spool shaft 15, a slider 22 that moves back and forth along the worm shaft 21, and an intermediate gear 23 fastened to the fore end of the worm shaft 21. The rear end of the spool shaft 15 is non-rotatably fastened to the slider 22. The intermediate gear 23 meshes with the pinion gear 12.

The rotor 3, as shown in FIG. 2, includes a cylindrical portion (a rotor body portion) 30 fastened to the pinion gear 12, first and second rotor arms 31 and 32 which are arranged on opposite sides of to the cylindrical portion 30, and a bail arm 34 to guide fishing line onto the spool 4. The cylindrical portion 30 and the first and second rotor arms 31 and 32 are preferably made of, for example, aluminum alloy, and are formed integrally with one another as a one-piece unitary unit. The center portion of the fore-end of the cylindrical portion 30 is non-rotatably fastened to the fore-end of the pinion gear 12 by the nut 33 described above.

Figure 3:
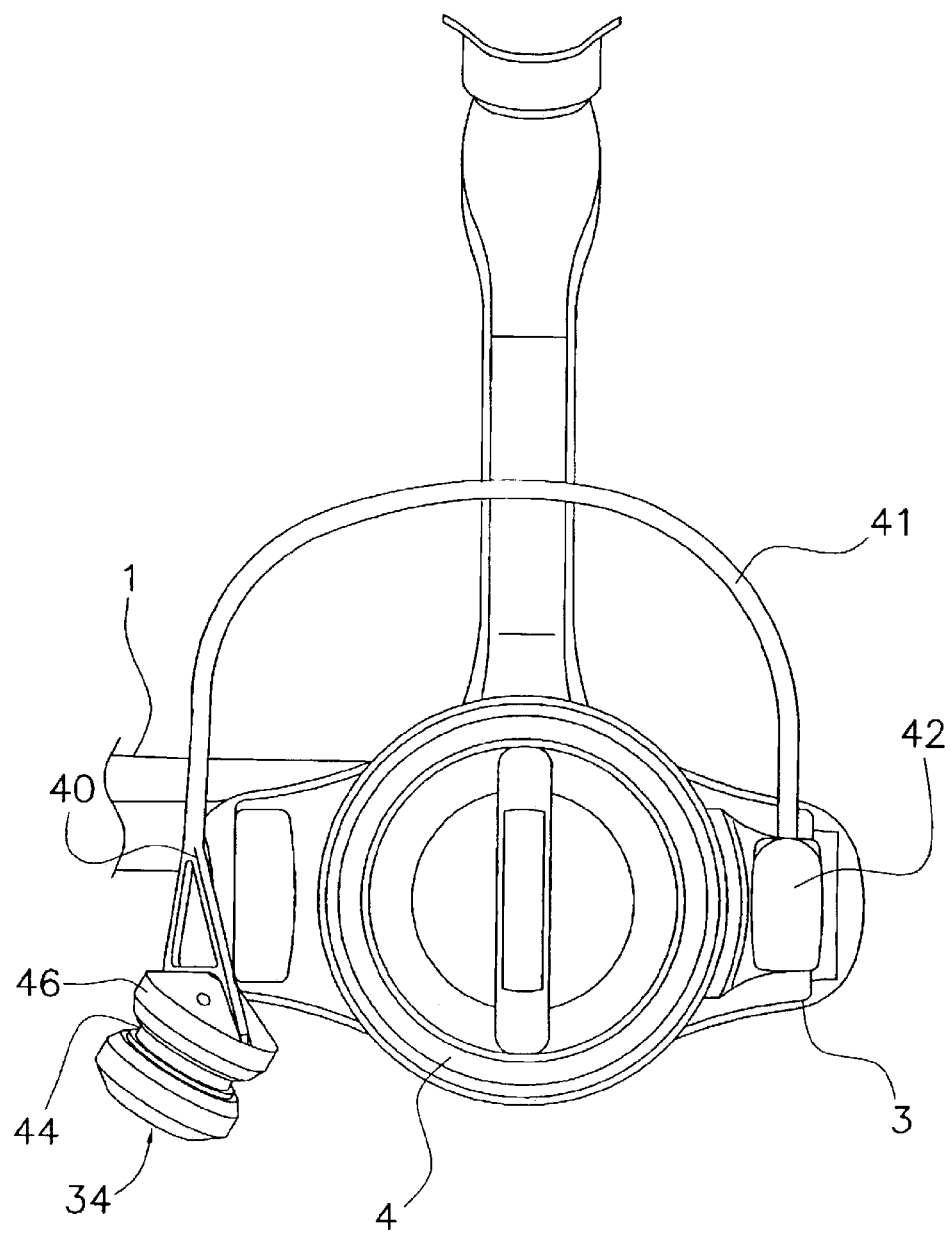
FIG. 3 is a front elevational view of the spinning reel in accordance with a preferred embodiment of the present invention.

A fishing-line guiding mechanism 100 shown in FIG. 3 includes the bail 34, first and second bail-support members 40 and 42, a stationary shaft 43, a stationary shaft cover, and a line roller 44.

The bail arm 34 is mounted onto the fore-ends of the first rotor arm 31 and the second rotor arm 32 so as to be pivotable between a line-guiding posture and a line-releasing posture. The bail arm 34 has a first bail-support member 40 and a second bail-support member 42 that are respectively mounted pivotably onto the fore-ends of the first rotor arm 31 and the second rotor arm 32. The first bail-support member 40 is pivotably mounted to a radially outer portion of the first rotor arm 31, while the second bail-support member 42 is pivotably mounted to a radially inner portion of the second rotor arm 32, as shown in FIG. 2. As shown in FIG. 3 to FIG. 6, the bail arm 34 further includes a bail 41, a stationary shaft 43, a line roller 44, and a stationary shaft cover 46. The bail 41 is provided to connect the first bail-support member 40 and the second bail-support member 42. As seen in FIGS. 5 and 6, the fore-end of the stationary shaft 43 is fastened to the first bail-support member 40. The line roller 44 is supported on the stationary shaft 43. The stationary shaft cover 46 is provided to cover the stationary shaft 43.

Figure 4:
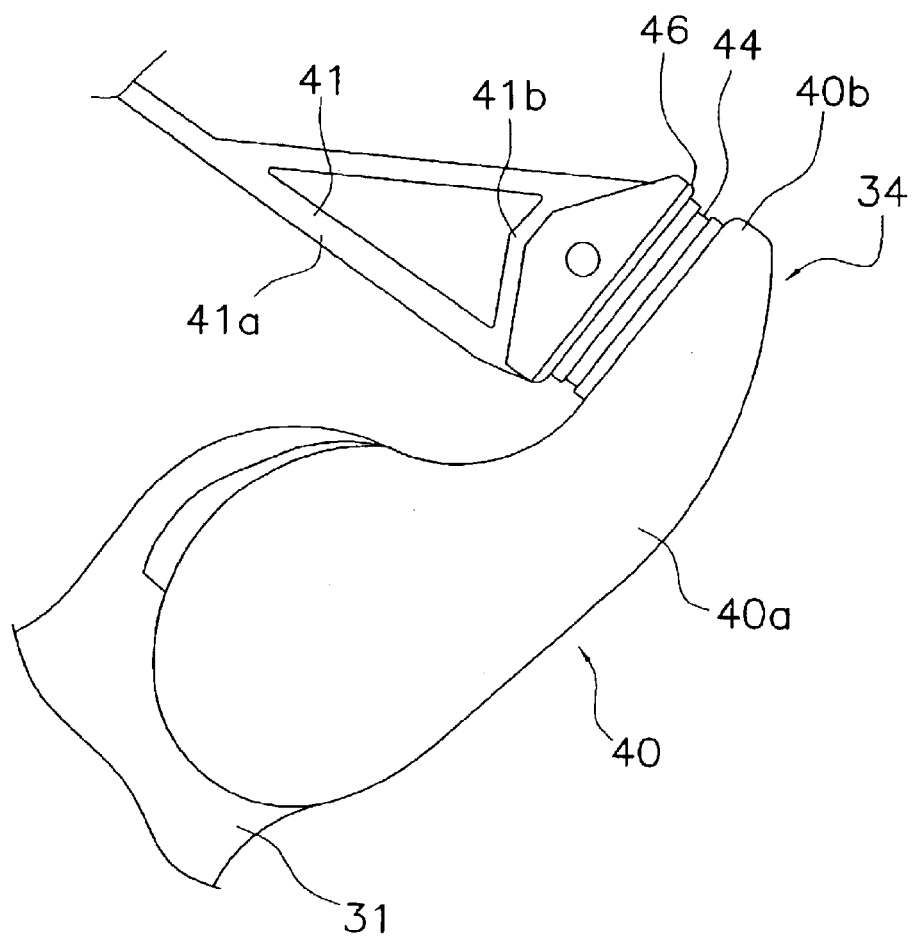
FIG. 4 is a perspective view of the bail arm of the spinning reel in accordance with a preferred embodiment of the present invention.
Figure 5:
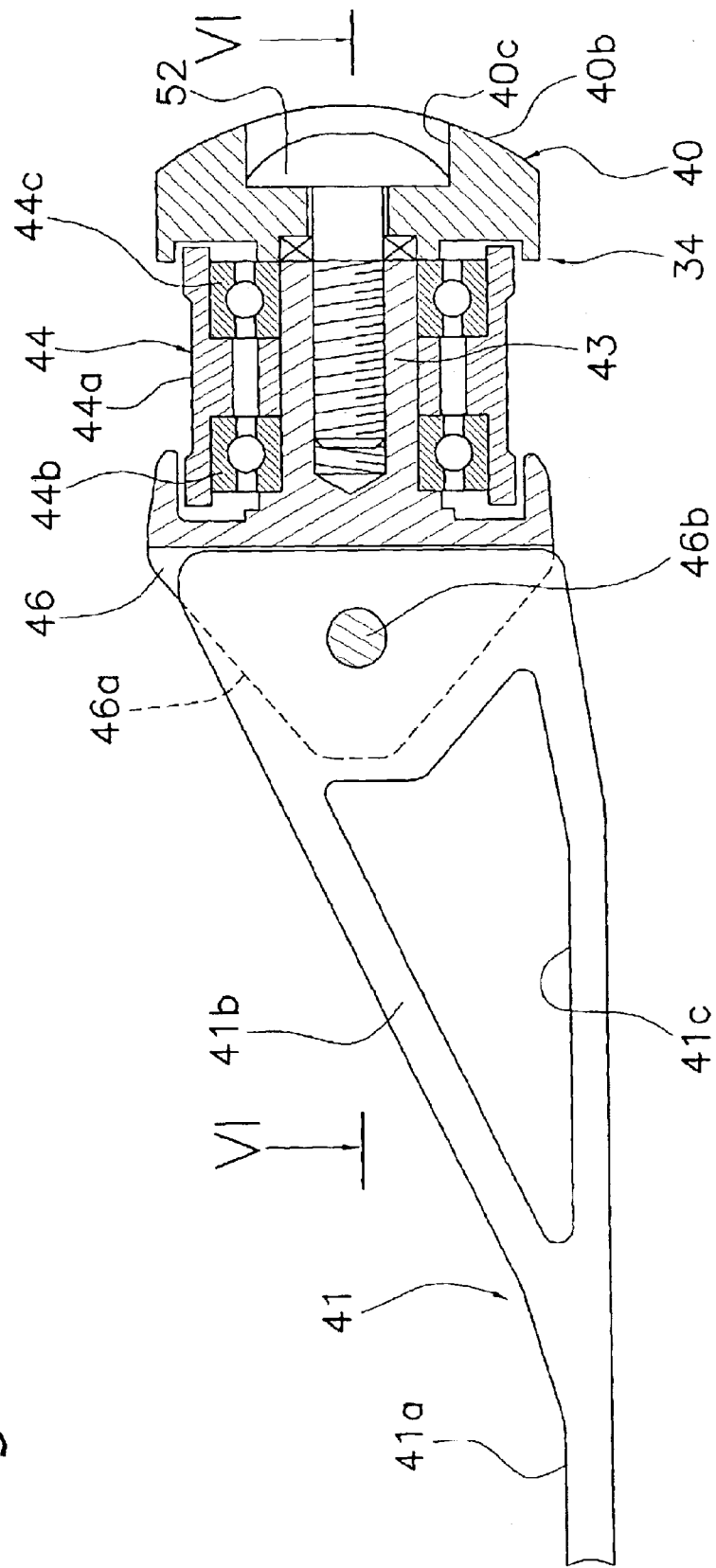
FIG. 5 is a cross-sectional view of the bail arm of the spinning reel in accordance with a preferred embodiment of the present invention, as viewed along the line V—V in FIG. 1.
Figure 6:
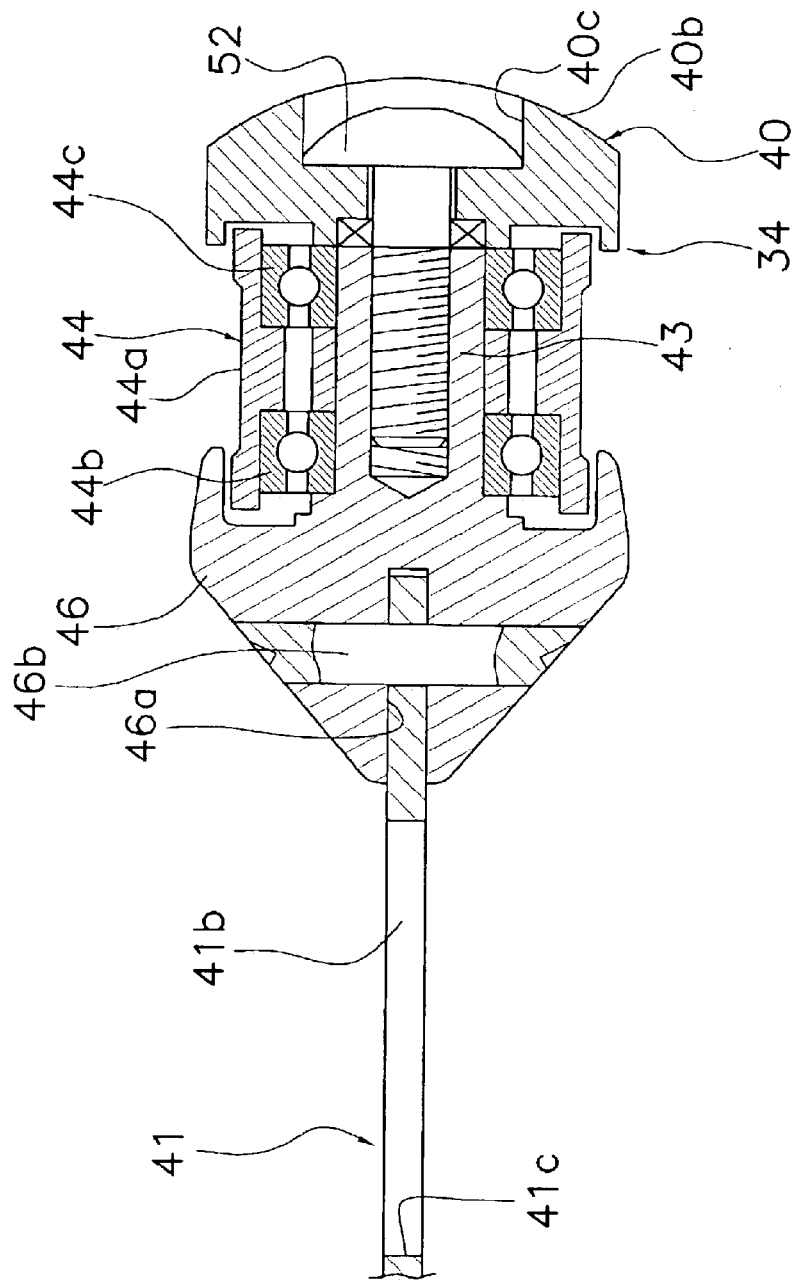
FIG. 6 is a cross-sectional view of the bail arm of the spinning reel in accordance with a preferred embodiment of the present invention, as viewed along the line VI—VI in FIG. 5.

As shown in FIG. 4 to FIG. 6, the first bail-support member 40 has, an arm portion 40a pivotably mounted on the first rotor arm 31, and a ring-shaped mounting portion 40b integrally formed with the fore-end of the arm portion 40a. As seen in FIGS. 5 and 6, the mounting portion 40b is formed with a stepped through hole 40c. Further, a fastening bolt 52 is provided to fasten the stationary shaft 43 onto the first bail-support member 40 and penetrates through the through hole 40c.

As shown in FIG. 3, the bail 41 is, a curved rod-shaped member that is preferably made of stainless alloy. Respective ends of the bail 41 are fastened to the second bail-support member 42 and the stationary shaft cover 46. The bail 41 is curved and disposed radially outward of the spool 4. The bail 41 is provided to guide fishing line to the line roller 44 via the stationary shaft cover 46 when the bail arm 34 returns from the line-releasing posture to the line-guiding posture.

The bail 41 includes, as shown in FIG. 4 to FIG. 6, a rod-shaped portion 41a formed into a rod shape and a plate-shaped portion 41b formed into a plate shape. One end of the plate-shaped portion 41b is joined continuously and smoothly with the stationary shaft cover 46, while the other end the plate-shaped portion 41b is integrally joined continuously and smoothly with the rod-shaped portion 41a to form a one-piece unitary member. The rod-shaped portion 41a is preferably a solid columnar member. The plate-shaped portion 41b is formed by press-working so that it has a substantially triangular cross section, as shown in FIG. 5. The plate-shaped portion 41b preferably has a cut-out portion or aperture 41c formed in its center portion, as shown in FIGS. 5 and 6.

The stationary shaft 43 is a member formed integrally with the stationary shaft cover 46 by cutting. Thus, the stationary shaft 43 and the stationary shaft cover 46 preferably are formed as a one-piece unitary member. The stationary shaft 43 extends from the base end that is integrally attached to the stationary shaft cover 46 toward the first bail-support member 40. The first bail-support member 40 is fixedly coupled to the fore-end of the stationary shaft 43 by the fastening bolt 52.

The line roller 44, as shown in FIGS. 5 and 6, includes a tubular guide portion 44a, the outer peripheral surface of which has a groove for guiding fishing line, and two antifriction bearings 44b and 44c spaced apart and disposed at the inner peripheral side of the guide portion 44a. The guide portion 44a is supported freely rotatably on the stationary shaft 43 via the two bearings 44b and 44c.

The stationary shaft cover 46, as shown in FIGS. 5 and 6, is provided on the base end of the stationary shaft 43 so as to be spaced from the mounting portion 40b of the first bail-support member 40. The stationary shaft cover 46 is a substantially truncated conical member made of aluminum alloy, the tip of which has a groove portion 46a opening in a slit shape. The plate-shaped portion 41b of the bail 41 is inserted into the groove portion 46a of the stationary shaft cover 46 so as to be joined continuously and smoothly with the stationary shaft cover 46. In this embodiment, the radially outer sides or the fishing-line guiding sides (the bottom side in FIG. 5), as well as the radially inner sides (the upper side in FIG. 5) of the plate-shaped portion 41b and the stationary shaft cover 46 define continuous and smooth surfaces. The fore-end of the plate-shaped portion 41b is inserted such that there is a gap between the plate-shaped potion 41b and the bottom of the groove portion 46a of the stationary shaft cover 46. The fore end of the plate-shaped portion 41b is fastened to the stationary shaft cover 46 by a rivet 46b. The rivet 46b penetrates through the stationary shaft cover 46 and the plate-shaped portion 41b, and is riveted at its both ends.

Next, handling and operation of the reel will be described in detail.

Referring to FIG. 1, when casting the rotor 3 is put into a reverse rotation-prevention state and the bail arm 34 is returned into the line-releasing posture by flipping the bail arm 34 with the hand. When the bail arm 34 is flipped over to the line-releasing posture, fishing line can be easily cast out from the spool 4.

When the handle 1 is rotated in the line-retrieving direction after casting while the bail arm 34 is maintained in the line-releasing posture, the rotor 3 is rotated in the line-retrieving direction by the rotor drive mechanism 5. When the rotor 3 rotates in the line-retrieving direction, the bail arm 34 automatically returns to the line-retrieving posture. At this time, if the handle 1 is further rotated in the line-retrieving direction, fishing line is guided from the bail 41 onto the line roller 44 via the stationary shaft cover 46, and is wound onto the spool 4.

As seen in FIGS. 5 and 6, in this spinning reel, the bail 41 has the rod-shaped portion 41a formed into a rod shape and the plate-shaped portion 41b formed into a plate shape such that the plate-shaped portion 41b is inserted into the groove portion 46a of the stationary shaft cover 46 and is joined continuously and smoothly with the rod-shaped portion 41a. Herein, the bail 41 is joined with the stationary shaft cover 46 such that a continuous and smooth surface 46c is defined. Consequently, there is no surface level difference between the stationary shaft cover 46 and the bail 41, and the fishing line is not easily hooked or entangled between the stationary shaft cover 46 and the bail 41. Moreover, the rod-shaped portion 41a and the plate-shaped portion 41b are integrally formed as a one-piece unitary member so that they are joined continuously and smoothly to each other. Therefore, there is no surface level difference between the rod-shaped portion 41a and the plate-shaped portion 41b either. Thus, line tangling between the rod-shaped portion 41a and the plate-shaped portion 41b is not likely to occur.

Other Embodiments (a) In the foregoing embodiment, a front-drag type spinning reel was illustrated as an example, but the present invention is applicable to any spinning reel, such as a rear drag spinning reel, a spinning reel having no drag mechanism, a lever drag type spinning reel, and so forth.

(b) In the foregoing embodiment, the stationary shaft 43 and the stationary shaft cover 46 are formed integrally, but the stationary shaft 43 and the stationary shaft cover 46 may be formed separately from each other.

Figure 7:
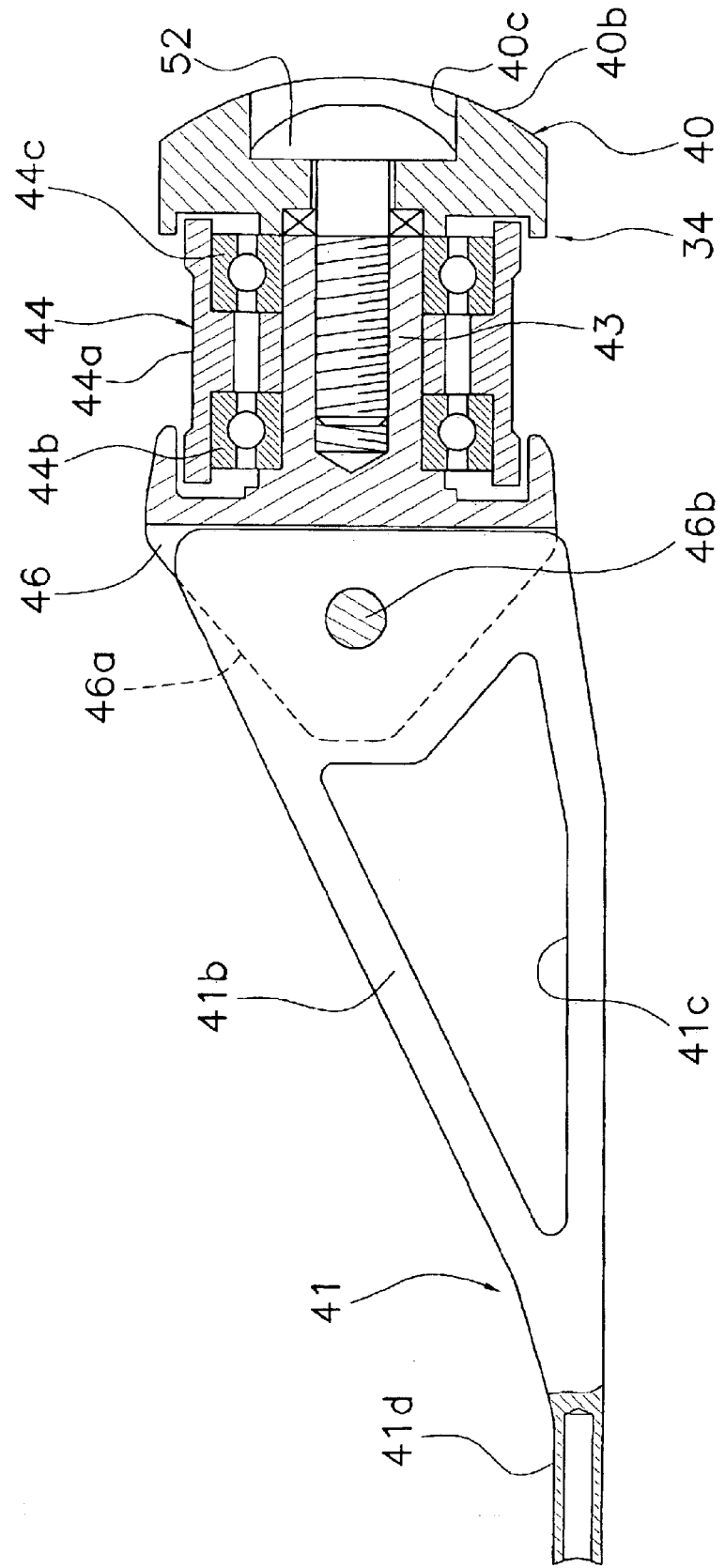
FIG. 7 is a cross-sectional view equivalent to FIG. 5, of a bail arm of the spinning reel in accordance with another embodiment of the present invention.

(c) In the foregoing embodiment, the rod-shaped portion 41a was illustrated as a solid columnar member, but the rod-shaped portion 41a may be a hollow tubular member 41d as shown in FIG. 7. If this is the case, the weight of the bail 41 is reduced.

In the foregoing embodiment, the plate-shaped portion 41a was formed so that it has a substantially triangular cross section, but the plate-shaped portion 41b may be formed into any shape insofar as a continuous and smooth fishing line-guiding surface is defined with the stationary shaft cover 46 and the rod-shaped portion 41a. In addition, the plate-shaped portion 41b was illustrated as having a cut-out portion or aperture 41c formed at its center portion, but the cut-out portion 41c may be omitted.

In a spinning reel fishing-line guiding mechanism according to the present invention, the bail is formed such that it is joined continuously and smoothly with the fishing-line guiding side of the stationary shaft cover. and Also, the plate-shaped portion the rod-shaped portion are joined continuously and smoothly with each other. Thus, it is possible to prevent line tangling.

"Means plus function" clauses as utilized in the specification and claims should include any structure or hardware and/or algorithm that can be utilized to carry out the function of the "means plus function" clause.

As used herein, the following directional terms "forward," "rearward," "above," "downward," "vertical," "horizontal," "below," and "transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-249253. The entire disclosure of Japanese Patent Application No. 2002-249253 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A spinning-reel fishing-line guiding mechanism adapted to be mounted on fore-ends of first and second rotor arms so as to be pivotable between a line-releasing posture and a line-retrieving posture, such that fishing line is guided onto a spinning-reel spool, said spinning-reel fishing-line guiding mechanism comprising:

first and second bail-support members being respectively and pivotably mounted on fore-ends of the first and second rotor arms;

a stationary shaft fixedly coupled to said first bail support member;

a line roller rotatably supported on said stationary shaft, said line roller having a guide portion defined on its circumferential surface, said guide portion being configured to guide the fishing line;

a stationary shaft cover fixedly coupled to said stationary shaft and spaced apart from said first bail support member to guide the fishing line to said line roller, an end of said stationary shaft cover having a slit-shaped groove portion; and a bail having a rod-shaped portion on one end and a plate-shaped portion on the other end, said bail being curved and disposed radially outward relative to the spool, said bail being configured to guide the fishing line onto said line roller via said stationary shaft cover, an end of said rod-shaped portion being fastened to said second bail support member, said plate-shaped portion being formed continuously and smoothly with said rod-shaped portion and inserted into said groove portion to join with said stationary shaft cover such that radially outer sides of said plate-shaped portion and said stationary shaft cover define a continuous and smooth surface.

2. The spinning-reel fishing-line guiding mechanism according to claim 1, wherein said plate-shaped portion is formed by press-working.

3. The spinning-reel fishing-line guiding mechanism according to claim 1, wherein said plate-shaped portion has a substantially triangular shape.

4. The spinning-reel fishing-line guiding mechanism according to claim 1, wherein said plate-shaped portion has an aperture.

5. The spinning-reel fishing-line guiding mechanism according to claim 4, wherein said plate-shaped portion is inserted into said groove portion such that radially inner sides of said plate-shaped portion and said stationary shaft cover define a continuous and smooth surface.

6. The spinning-reel fishing-line guiding mechanism according to claim 1, wherein said rod-shaped portion is a solid columnar member.

7. The spinning-reel fishing-line guiding mechanism according to claim 5, wherein said rod-shaped portion is a hollow tubular member.

8. The spinning-reel fishing-line guiding mechanism according to claim 1, wherein said plate-shaped portion is fastened to said stationary shaft cover by a rivet.

9. The spinning-reel fishing-line guiding mechanism according to claim 1, wherein said stationary shaft cover is a truncated conical member.

10. The spinning-reel fishing-line guiding mechanism according to claim 1, wherein said stationary shaft and said stationary shaft cover are formed as a one-piece unitary member.

11. A spinning reel comprising:

a handle;

a reel unit rotatably supporting said handle;

a rotor being rotatably supported in front of said reel unit, said rotor being configured to rotate in response to rotation of said handle, said rotor having a rotor body portion and first and second rotor arms that are disposed on that are arranged on opposite sides of said rotor body portion;

a spool disposed in front of said rotor so as to shift back and forth relative to said rotor and arranged between said first and second rotor arms such that fishing line is wound onto an outer circumferential surface of said spool; and a fishing-line-guiding mechanism, said line guiding mechanism being configured to guide fishing line onto said spool, said line-guiding mechanism including, first and second bail-support members being mounted pivotably on respective fore-ends of said first and second rotor arms, a stationary shaft fixedly coupled to said first bail-support member, a stationary shaft cover fixedly coupled to said stationary shaft and spaced apart from said first bail support member, an end of said stationary shaft cover away from said stationary shaft having a slit-shaped groove portion, a line roller rotatably supported on said stationary shaft, said line roller having a guide portion being formed on its circumferential surface, said guide portion being configured to guide fishing line, and a bail having a rod-shaped portion on one end and a plate-shaped portion on the other end, said bail being curved and disposed radially outward relative to said spool, said bail being configured to guide the fishing line onto said line roller via said stationary shaft cover, an end of said rod-shaped portion being fastened to said second bail support member, said plate-shaped portion being formed continuously and smoothly with said rod-shaped portion and inserted into said groove portion to join with said stationary shaft cover such that radially outer sides of said rod-shaped portion and said stationary shaft cover define a continuous and smooth surface.

12. The spinning reel according to claim 11, wherein said plate-shaped portion is formed by press-working.

13. The spinning reel according to claim 12, wherein said plate-shaped portion has a substantially triangular shape.

14. The spinning reel according to claim 11, wherein said plate-shaped portion has an aperture.

15. The spinning reel according to claim 14, wherein said plate-shaped portion is inserted into said groove portion such that radially inner sides of said plate-shaped portion and said stationary shaft cover define a continuous and smooth surface.

16. The spinning reel according to claim 11, wherein said rod-shaped portion is a solid columnar member.

17. The spinning reel according to claim 15, wherein said rod-shaped portion is a hollow tubular member.

18. The spinning reel according to claim 11, wherein said plate-shaped portion is fastened to said stationary shaft cover by a rivet.

19. The spinning reel according to claim 11, wherein said stationary shaft cover is a truncated conical member.

20. The spinning reel according to claim 11, wherein said stationary shaft and said stationary shaft cover are formed as a one-piece unitary member.

* * * * *